US008928457B2

(12) United States Patent
Jin et al.

(10) Patent No.: US 8,928,457 B2
(45) Date of Patent: Jan. 6, 2015

(54) SMART INTERLOCK SYSTEM AND WORKING METHOD THEREOF

(75) Inventors: Shuqiang Jin, Guangdong (CN); Qing Chang, Guangdong (CN)

(73) Assignee: Zhuhai Unitech Power Technology Co., Ltd. (CN)

( * ) Notice: Subject to any disclaimer, the term of this patent is extended or adjusted under 35 U.S.C. 154(b) by 488 days.

(21) Appl. No.: 13/503,622

(22) PCT Filed: Dec. 16, 2009

(86) PCT No.: PCT/CN2009/001463
§ 371 (c)(1),
(2), (4) Date: Apr. 23, 2012

(87) PCT Pub. No.: WO2011/057434
PCT Pub. Date: May 19, 2011

(65) Prior Publication Data

US 2012/0206235 A1 Aug. 16, 2012

(30) Foreign Application Priority Data

Nov. 16, 2009 (CN) ....................... 2009 1 0193955.2

(51) Int. Cl.
*G05B 19/00* (2006.01)
*E05B 47/06* (2006.01)

(Continued)

(52) U.S. Cl.
CPC ........ *E05B 47/0611* (2013.01); *G07C 9/00309* (2013.01); *E05B 17/0083* (2013.01); *E05B 19/0088* (2013.01); *E05B 2047/0062* (2013.01); *E05B 2047/0069* (2013.01); *G07C 2009/0088* (2013.01)
USPC .......................... 340/5.64; 340/5.63; 340/5.7

(58) Field of Classification Search
USPC ........................................ 340/5.64, 5.63, 5.7
See application file for complete search history.

(56) References Cited

U.S. PATENT DOCUMENTS 4,549,176 A * 10/1985 Kreft ............................ 340/5.63
6,439,009 B1 * 8/2002 Heese et al. ...................... 70/92

(Continued)

FOREIGN PATENT DOCUMENTS

CN 1414584 4/2003
CN 2569248 8/2003

(Continued)

OTHER PUBLICATIONS

International Search Report, PCT/CN2009/001463, Aug. 26, 2010.

*Primary Examiner* — Jennifer Mehmood
*Assistant Examiner* — Rufus Point
(74) *Attorney, Agent, or Firm* — Matthew A. Pequignot; Pequignot + Myers LLC

(57) ABSTRACT

A smart interlock system and a working method thereof. The smart interlock system includes a lock (1), an unlocking device (2) and a logic generator (3). The logic generator (3) comprises a logic generation module and a logic communication module. The logic generation module generates identity identification logic and state identification logic of the lock, and the two kinds of logic are sent to the unlocking device (2) through the logic communication module. The lock (1) comprises a lock tongue (102), a lock head (106) and an identity and state converting module (104). The unlocking device (2) comprises an unlocking module for starting the lock head to move, an identity identifying module (201) and a communication module. The identity identifying module (201) of the unlocking device identifies the identity of the lock, receives an identity label information which is transferred from the identity and state converting module (104) of the lock, recognizes the state of the lock tongue (102), and judges whether to unlock the lock or not according to the identity identification logic and state identification logic of the lock which are received from the logic generator (3). The smart interlock system works flexibly and enables electric anti-misoperation to be reliable and intelligent.

13 Claims, 8 Drawing Sheets

(51) Int. Cl.

| | |
|---|---|
| ***G07C 9/00*** | (2006.01) |
| *E05B 17/00* | (2006.01) |
| *E05B 19/00* | (2006.01) |
| *E05B 47/00* | (2006.01) |

(56) References Cited

U.S. PATENT DOCUMENTS

| | | | | |
|---|---|---|---|---|
| 7,236,085 | B1 * | 6/2007 | Aronson et al. | 340/5.64 |
| 7,321,288 | B2 * | 1/2008 | Nishimura | 340/5.2 |
| 7,880,585 | B1 * | 2/2011 | Aronson et al. | 340/5.73 |
| 8,274,365 | B2 * | 9/2012 | Piccirillo et al. | 340/5.6 |
| 2002/0180582 | A1 * | 12/2002 | Nielsen | 340/5.6 |
| 2004/0133653 | A1 * | 7/2004 | Defosse et al. | 709/217 |
| 2005/0113080 | A1 * | 5/2005 | Nishimura | 455/420 |
| 2006/0038654 | A1 * | 2/2006 | Khalil | 340/5.5 |
| 2006/0208069 | A1 * | 9/2006 | Gilbert et al. | 235/382.5 |
| 2006/0214766 | A1 * | 9/2006 | Ghabra et al. | 340/5.25 |
| 2007/0158414 | A1 * | 7/2007 | Sasakura et al. | 235/380 |
| 2011/0225433 | A1 * | 9/2011 | Wan | 713/190 |

FOREIGN PATENT DOCUMENTS

| | | |
|---|---|---|
| CN | 2874744 | 2/2007 |
| CN | 201217990 | 4/2009 |

* cited by examiner

SMART INTERLOCK SYSTEM AND WORKING METHOD THEREOF

RELATED APPLICATION DATA

This application is the national stage entry of International Appl. No. PCT/CN2009/001463, filed Dec. 16, 2009, which claims priority to Chinese Patent Application No. 200910193955.2, filed Nov. 16, 2009. All claims of priority to these applications are hereby made, and each of these applications is hereby incorporated in its entirety by reference.

TECHNICAL FIELD

The present invention relates to techniques of electric equipment, and more particularly, to a smart interlock system and a working method thereof.

BACKGROUND OF THE INVENTION

Currently, there are two means of preventing false operations on electric equipment. One makes use of the linkage relations between the locks (or by means of key-exchange), which is specified as follows: suppose there are three sets of equipment A, B and C, which are operated in sequence of A, B and C strictly, the three sets of equipment are respectively installed with program-locks indicating the sequence; during operation, only when the program-lock installed on the equipment A is unlocked can the equipment A be operated; what's more, only after the operation of the equipment A is completed, can the key for the program-lock installed on the equipment B be obtained to unlock the program-lock, and then can the equipment B be operated. By this means, the operations are performed in sequence of A, B and C strictly. The other means is performed by computer, of which the operation sequence of equipment is built in the key to the computer and the operations are performed strictly in sequence by means of the key. But these two means both have defects. With respect to the first means, the relations between the equipment are expressed in terms of relations between the locks, which lacks flexibility. What's more, when there are more sets of equipment and the logic relationship is complex, much more locks need to be installed and much more logic processes of key-exchange are needed. Furthermore, the physical locks are easily damaged by natural factors such as corrosion, and have high damage rate and breakdown rate. If one of the locks can't work, the subsequent operations will be influenced. With respect to the second means, the logical relations between the equipment are stored in the key to the computer in form of data. The locked state of the lock ensures the equipment not to be operated, but no or only part of the state information of the locks is exchanged between the locks and the key to the computer, which makes the key to the computer can't correctly acquire the present state of the equipment in operation, so that the operation for some equipment in the sequence of operations might be left out, and some false operations may occur.

SUMMARY OF THE INVENTION

The present invention is aimed at providing a smart interlock system and a working method thereof, which can solve the problem that the traditional program-locks lack flexibility and modifiability due to the dependence of logical relations on structural relations. The present invention makes the complicated logical relations very simple by configuring data, and makes the preventing false operations of the electric equipment simple and convenient, reliable and intelligent.

The object of the present invention is achieved by the following technical scheme: an smart interlock system comprises a lock, an unlocking device and a logic generator. The logic generator comprises a logic generation module and a logic communication module. The logic generation module generates identity identification logic and state identification logic of the lock, and the identity identification logic and state identification logic are sent to the unlocking device through the logic communication module. The unlocking device comprises an unlocking module, an identity identifying module and a communication module for starting a lock head. The lock comprises a lock tongue, the lock head, and an identity and state conversion module. The lock head is connected with the lock tongue and drives the lock tongue to move. While in motion, the lock tongue has more than two set positions and intermediate positions between set positions. The identity and state conversion module converts information of change of position of the lock tongue into identity label information of the lock, and then transmits the identity label information of the lock to the unlocking device. The identity identifying module of the unlocking device identifies the identity of the lock, receives the identity label information which is transmitted from the identity and state conversion module of the lock, identifies the state of the lock tongue, and judges whether the process of unlocking shall be performed or not according to the identity identification logic and state identification logic of the lock, which are received from the logic generator.

A working method of the smart interlock system comprises the steps as follows: the logic generation module of the logic generator generates identity identification logic and state identification logic of the lock, and the identity identification logic and state identification logic are sent to the unlocking device through the logic communication module; the identity and state conversion module converts information of the change of position of the lock tongue into the identity label information of the lock, and then transmits the identity label information of the lock to the unlocking device; the identity identifying module of the unlocking device identifies the identity of the lock, receives the identity label information of the lock which is transmitted by the identity and state conversion module of the lock, and identifies the state of the lock tongue; according to the identity identification logic and state identification logic of the lock, which are received from the logic generator, the identity identifying module of the unlocking device judges whether the equipment installed with the lock is allowed to be operated; if yes, an unlocking mechanism of the unlocking device allows unlocking, and drives unlocking parts of the lock so as to drive the lock tongue to move, then the equipment can be operated; if not, the lock can't be unlocked and the equipment can't be operated.

The present invention has following advantages:

According to the present invention, the smart interlock system and the working method thereof of are provided, which combine the means of computer preventing false operations with the means of program-locks, wherein, the lock is provided with a converting module, which can identify the state of the lock tongue of the lock, so as to provide a basis for converting the mechanical lock to an electric one, equipment can be operated sequentially without relying on the state relations between the locks or the logical relations between the keys, which are necessary factors for the traditional program-locks. What's more, the sequence of operations of the equipment is stored in the mistake-proofing data storage of equipment in form of data, so it can be configured and changed flexibly via the logic generator, which thoroughly solves the problem that the traditional program-locks lack flexibility and modifiability due to the dependence of logical relations on structural relations. Additionally, in the present invention, the complicated logical relations become very simple due to data configuration. The unlocking device can indirectly obtain the state of the equipment according to the state of the lock, which provides a basis for more effective use of the states of the equipment, for example, the states of the equipment can be provided to other devices, and especially, the ID code and state of the lock are transmitted between the lock and the unlocking device wirelessly, and the unlocking device can obtain the locking or unlocking instructions from the mistake-proofing system via the sequence of operations built-in or via wireless communication. The smart interlock system and the working method thereof of the present invention are mainly used for preventing the false operations of the equipment in the power system, and they may also be used in other occasions where equipment is required to be operated in sequence.

BRIEF DESCRIPTION OF THE DRAWINGS

The present invention will be described in more details with reference to the accompanying drawings and the embodiments.

DETAILED DESCRIPTION OF THE PREFERRED EMBODIMENTS

Figure 1:
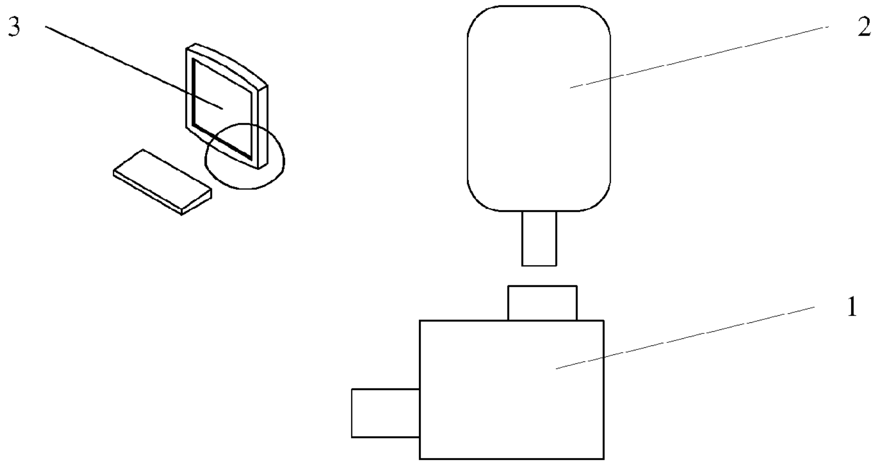
FIG. 1 is a schematic diagram illustrating the smart interlock system of the present invention.

As shown in FIGS. 1-8, the smart interlock system disclosed in the present invention comprises a lock 1, an unlocking device 2 and a logic generator 3. The logic generator 3 comprises a logic generation module and a logic communication module. The logic generation module generates identity identification logic and state identification logic of the lock, and the identity identification logic and state identification logic are sent to the unlocking device 2 through the logic communication module. The unlocking device 2 comprises an unlocking module, an identity identifying module and a communication module for starting a lock head. The lock 1 comprises a lock tongue 102, the lock head 106, and an identity and state conversion module 104. The lock head 106 is connected with the lock tongue 102 and drives the lock tongue 102 to move. While in motion, the lock tongue 102 has more than two set positions and intermediate positions between set positions. The identity and state conversion module 104 converts information of change of position of the lock tongue 102 into identity label information of the lock, and then transmits the identity label information of the lock to the unlocking device 2. The identity identifying module of the unlocking device 2 identifies the identity of the lock 1, receives the identity label information which is transmitted from the identity and state conversion module 104 of the lock, identifies the state of the lock tongue 102, and judges whether the process of unlocking shall be performed or not according to the identity identification logic and state identification logic of the lock, which are received from the logic generator 3.

Figure 2:
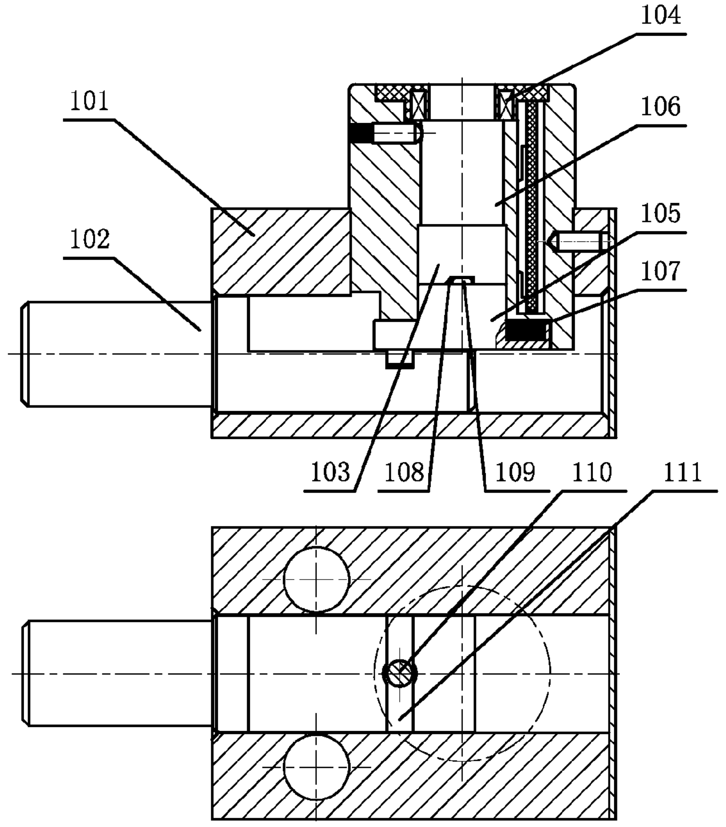
FIG. 2 is a schematic diagram illustrating the locked state of the lock of the smart interlock system of the present invention.
Figure 3:
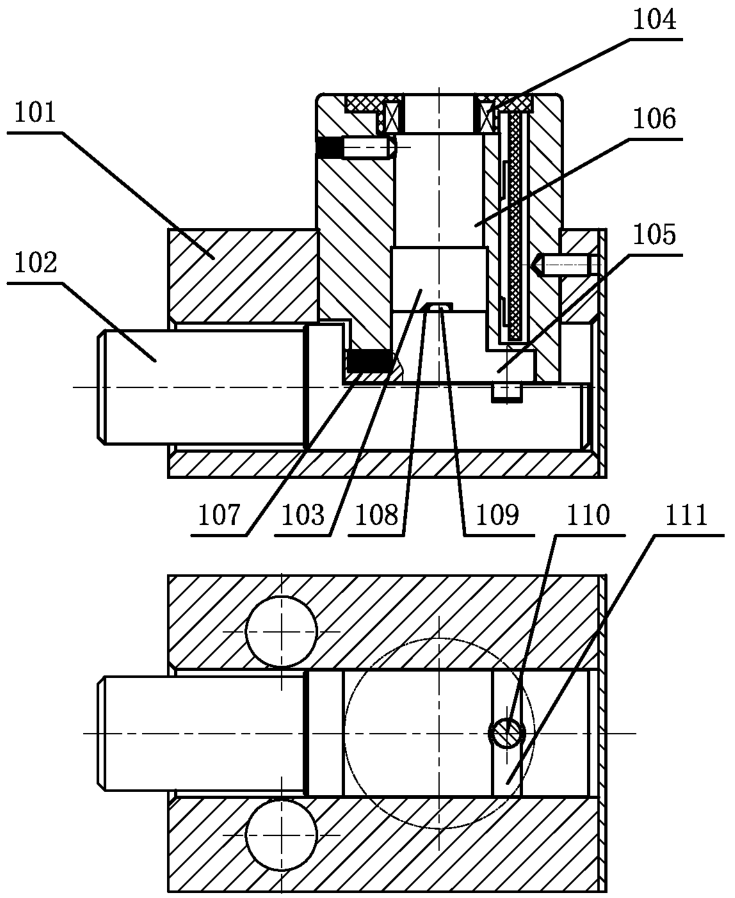
FIG. 3 is a schematic diagram illustrating the unlocked state of the lock of the smart interlock system of the present invention.
Figure 4:
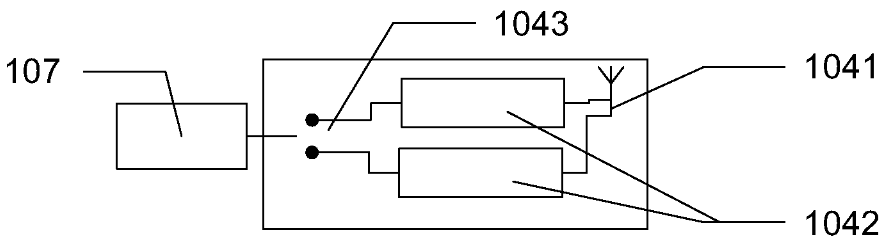
FIG. 4 is a schematic diagram illustrating the converting module of the lock of the smart interlock system of the present invention.

As shown in FIGS. 2, 3 and 4, the lock tongue 102 of the lock 1 is a bolt structure which is installed in the inner cavity of a lock body 101 and can move left and right. The lock head 106 comprises a top cover disposed at outermost end thereof, a lock core under the top cover, a stepped and cylindrical converting mechanism 103 and a turntable locking mechanism 105 under the converting mechanism 103. The turntable locking mechanism 105 is provided with a sliding pin 109 in the center of a top surface. The converting mechanism 103 is provided with a wedge-shaped groove 108 at the bottom. The sliding pin 109 is located in the wedge-shaped groove 108 so that a unidirectional ratchet mechanism is constituted. The lock tongue 102 is provided with a slide groove 111 whose opening faces upward. The turntable locking mechanism 105 is provided with a slide bar 110 at one end of the bottom. The slide bar 110 is located in the slide groove 111, and so the turntable locking mechanism 105 drives the lock tongue 102 to move when it rotates.

The lock 1 comprises one or more sensors 107 which are installed on the turntable locking mechanism 105. The identity and state conversion module 104 comprises a switch 1043, electronic circuits 1042 and an antenna 1041. The sensors 107 are electrically connected with the identity and state conversion module 104. The antenna 1041 is installed on top of the lock head 106.

The identity and state conversion module 104 comprises at least two RFID identity chips with no need for power supply.

The lock realizes locking or unlocking by the motion of the lock tongue. The sensors 107 are installed on the turntable locking mechanism 105 which is associated with the lock tongue 102 through the slide bar 110, so that the change of position of the lock tongue 102 are detected by the sensors 107 and the switch 1043 of the identity and state conversion module 104 switches to make the electronic circuits 1042 to work. Then the unlocking device can identify the position of the lock tongue correctly by identifying the change of position wirelessly.

The sensors 107 may be in the form of an assembly of a magnet and a reed switch, or in the form of a travel switch.

Figure 5:
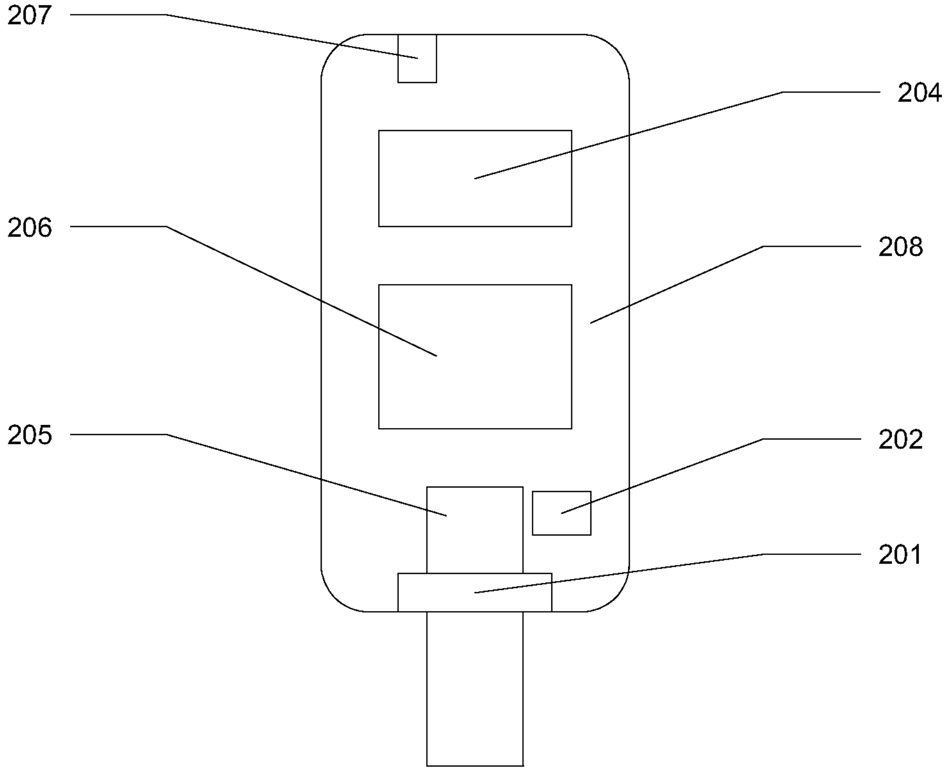
FIG. 5 is a planform illustrating the unlocking device of the smart interlock system of the present invention.
Figure 6:
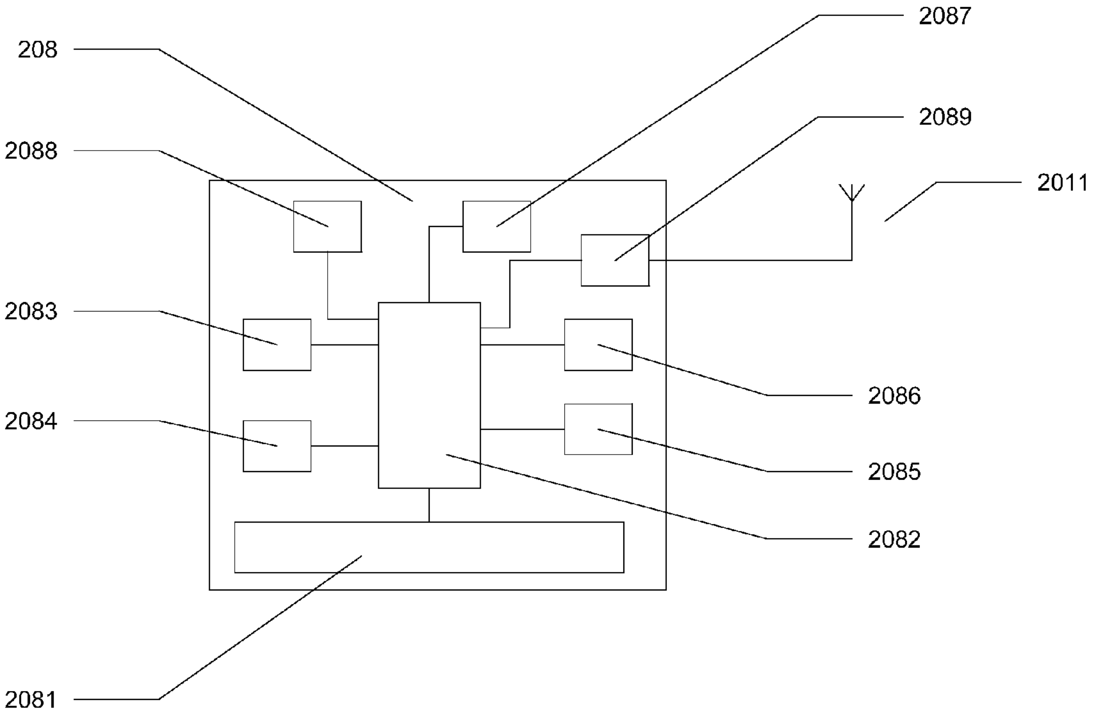
FIG. 6 is a schematic diagram illustrating the internal circuit of the unlocking device of the smart interlock system of the present invention.

As shown in FIGS. 5 and 6, the unlocking device 2 comprises a case 208. The unlocking module 205 and the identity identifying module 201 are installed at one end of the case 208. The case 208 is provided with a man-machine interface thereon, a control circuit therein and a socket 207 for recharging batteries on one side thereof.

The identity identifying module 201 is a wireless identity identifying module.

The man-machine interface comprises keys 204, a display 206 and a sounder 202. The display 206 may be a LCD or an OLED or so on, which can display black and white information, or color information. The display is controlled by a microprocessor CPU and is electrically connected with the control circuit.

The control circuit of the unlocking device 2 comprises a battery 2081, a microprocessor CPU 2082, a sounder circuit 2083, a memory circuit 2084, a wireless communication circuit 2085, an unlocking driving circuit 2086, a wireless identification circuit 2089, a display circuit 2087 and a keys circuit 2088. The microprocessor CPU 2082 is connected electrically and respectively with the sounder circuit 2083, the memory circuit 2084, the wireless communication circuit 2085, the unlocking driving circuit 2086, the wireless identification circuit 2089, the display circuit 2087 and the keys circuit 2088, all of which are disposed inside the case 208. The display circuit 2087, the keys circuit 2088 and the sounder circuit 2083 are respectively disposed to drive the display 206, the keys 204 and the sounder 202.

The microprocessor CPU 2082 may be a kind of microprocessor or a programmable device.

The battery 2081, which is installed inside the case 208, is connected with the other circuits inside the case through wires or spring pieces, and is electrically connected with the socket 207 through a recharging circuit.

The unlocking module comprises an energy conversion module capable of converting mechanical energy to electrical energy for driving the solenoid or the motor. The unlocking module is electrically connected with and controlled by the microprocessor CPU 2082.

The wireless identification circuit 2089 and an antenna 2011 of the unlocking device match with the identity and state conversion module 104 and the antenna 1041 of the lock.

Figure 7:
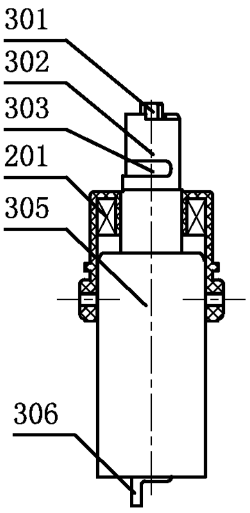
FIG. 7 is a schematic diagram illustrating the unlocking head of the unlocking device of the smart interlock system of the present invention.
Figure 8:
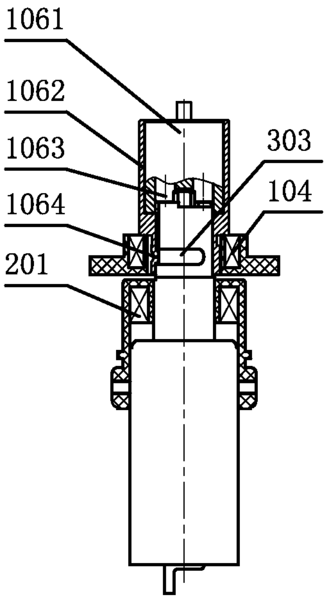
FIG. 8 is a schematic diagram illustrating the coordination for unlocking between the unlocking device and the lock according to the smart interlock system of the present invention.
Figure 9:
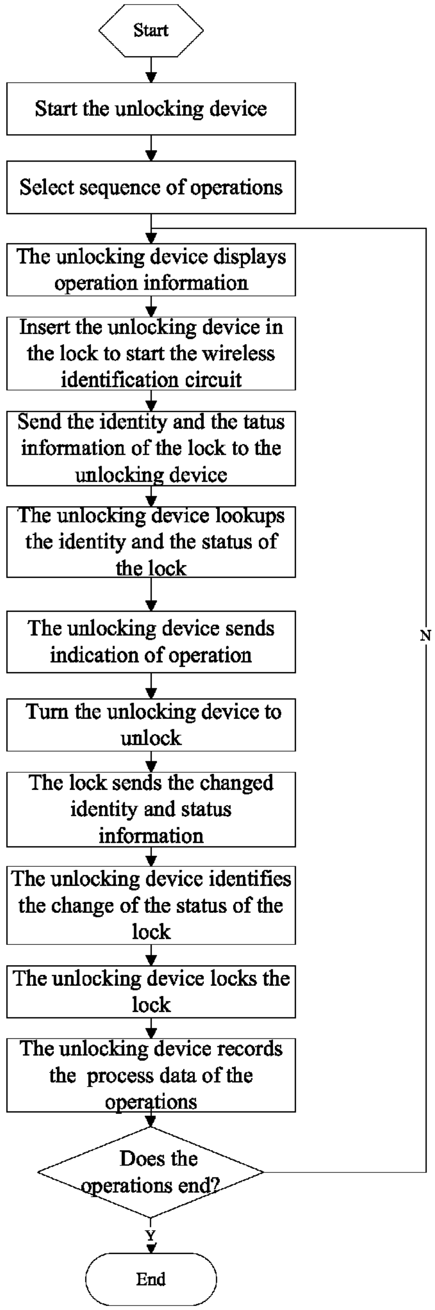
FIG. 9 is a flow chart illustrating the process of unlocking and locking according to the method of the smart interlock system of the present invention.

As shown in FIGS. 7 and 8, the unlocking module has two states of locking and unlocking. The unlocking module comprises an unlocking head 301, an unlocking rod 302, a stop groove 303, a solenoid (an electromagnet) 305 and a position detector 306. The identity identifying module 201 is disposed at the exterior of the unlocking rod 302 and near one end of the solenoid 305. The unlocking head 301 is telescopically located on top of the unlocking rod 302. The stop groove 303 is disposed on the unlocking rod 302 and the solenoid 305 is disposed at bottom of the unlocking rod 302.

The lock core of the lock comprises a lock core body 1061, a lock core case 1062, a steel ball 1063 and a stop abutment 1064. The marble 1063 and the stop abutment 1064 are disposed inside the lock core case 1062, and the stop abutment 1064 is disposed on sidewall of an inner through hole of the top cover. When the unlocking device is in the state of unlocking, the stop abutment 1064 is inserted in the stop groove 303.

As shown in FIG. 8, the unlocking device can be inserted in and extracted from the lock only in one direction. If the unlocking device is turned clockwise after it is inserted in the lock, the stop groove 303 will be locked by the stop abutment 1064, and the unlocking device can't be extracted from the lock unless the unlocking device is turned counter-clockwise to the position where it is inserted. The wedge-shaped groove 108 and the sliding pin 109 of the lock constitute the unidirectional ratchet mechanism. If the unlocking device is turned clockwise, the lock tongue will be driven to move, but if the unlocking device is turned counter-clockwise, only the unlocking device will be returned to its original position while the lock tongue will not move, which guarantees that only when the lock tongue turns to a certain position can the unlocking device be extracted after being turned counter-clockwise to its original position, but the unlocking device can not be extracted at other intermediate positions.

The logic generator comprises a logic generation module and a logic communication module. The logic generation module is a suite of software which comprises a user interface module, a mistake-proofing data storage module of equipment, a logic storage module of equipment, a data modification module and so on. The logic communication module comprises a power module, a wireless communication module and an antenna.

The Process of Unlocking:

As shown in FIGS. 2 and 3, before unlocking, the lock tongue 102 of the lock is being ejected as shown in FIG. 2. When the unlocking module 205 of the unlocking device 2 is inserted in the lock 1, under induction of the identity identifying module 201 of the unlocking device 2, the ID code and the state information of the lock are coupled to the antenna 2011 through the antenna 1041 by the identity and state conversion module 104 of the lock, and then are transmitted to the identity identifying module 201, and finally are transmitted to the microprocessor CPU 2082 for processing. After the CPU 2082 makes judgments, if unlocking is needed, the unlocking device 2 drives the unlocking head 301 to eject, and the unlocking head 301 fits tightly with the marble of the lock core 106 of the lock so that they move jointly. Turn the unlocking device to drive the converting mechanism 103 to rotate, and then the converting mechanism 103 drives the turntable locking mechanism 105 to rotate. The rotation of the turntable locking mechanism 105 is converted to linear motion of the lock tongue 102 through the slide bar 110. When the lock tongue reaches the first set position, the lock has changed from the state shown in FIG. 2 to the state shown in FIG. 3. The sensors 107 installed on the turntable locking mechanism 105 drive the switch 1043 to work so as to switch the electronic circuits 1042. The identity and state conversion module 104 sends the new ID code containing the state to the identity identifying module of the smart unlocking device. When the smart unlocking device detects the change of the state, it will indicate success of unlocking, stop the unlocking device from turning. Turn the unlocking device reversely to release the stop abutment 1064 from engaging with the stop groove 303, pull out the smart unlocking device, and the process of unlocking finishes.

The Process of Locking:

As shown in FIG. 3, before locking, the lock tongue 102 of the lock is being retracted. When the unlocking module 205 of the smart unlocking device 2 is inserted in the lock 1, under the induction of the identity identifying module 201 of the smart unlocking device 2, the ID code and the state information of the lock are coupled to the antenna 2011 through the antenna 1041 by the identity and state conversion module 104 of the lock, and then are transmitted to the identifying module 201, and finally are transmitted to the microprocessor CPU 2082 for processing. After the CPU 2082 makes judgments, if locking is needed, the unlocking device 2 drives the unlocking head 301 to eject, and the unlocking head 301 fits tightly with the marble of the lock core 106 of the lock so that they move jointly. Turn the unlocking device to drive the converting mechanism 103 to rotate, and then the converting mechanism 103 drives the turntable locking mechanism 105 to rotate. The rotation of the turntable locking mechanism 105 is converted to linear motion of the lock tongue 102 through the slide bar 110. When the lock tongue reaches the second set position, the lock has changed from the state shown in FIG. 3 to the state shown in FIG. 2. The sensors 107 installed on the turntable locking mechanism 105 drive the switch 1043 to work so as to switch the electronic circuits 1042. The identity and state conversion module 104 sends the new ID code containing the state to the identity identifying module of the smart unlocking device. When the smart unlocking device detects the change of the state, it will indicate success of locking, stop the unlocking device from turning. Turn the unlocking device reversely to release the stop abutment 1064 from engaging with the stop groove 303, pull out the smart unlocking device, and the process of locking finishes.

The lock can transmit the change of the position of the lock tongue to the change of the identity label of the lock through the identity and state conversion module 104, and transmits the change of the state to the unlocking device of the lock. A plurality of positions and states of the lock tongue can be identified by use of the different identity labels in combination with a position change detecting module inside the lock, and the states of every lock is transmitted to the unlocking device through Radio Frequency Identification (RFID), or infrared ray or any other contact or non-contact transmission method. The unlocking device downloads computer programmed software of the execution sequences, unlocks a specific lock according to the execution sequences, judges the states of the lock before and after the operation, so as to judge whether electric power equipment is operated according to the predetermined sequences.

The working method of the smart interlock system above comprises the following steps: The logic generation module of the logic generator generates identity identification logic and state identification logic of the lock, and the identity identification logic and state identification logic are sent to the unlocking device through the logic communication module. The identity and state conversion module converts information of the change of position of the lock tongue into the identity label information of the lock, and then transmits the identity label information of the lock to the unlocking device. The identity identifying module of the unlocking device identifies the identity of the lock, receives the identity label information of the lock which is transmitted by the identity and state conversion module of the lock, and identifies the state of the lock tongue. According to the identity identification logic and state identification logic of the lock, which are received from the logic generator, the identity identifying module of the unlocking device judges whether the equipment installed with the lock is allowed to be operated. If yes, an unlocking mechanism of the unlocking device allows unlocking, and drives unlocking parts of the lock so as to drive the lock tongue to move, then the equipment can be operated. If not, the lock can't be unlocked and the equipment can't be operated.

The wireless communication module of the unlocking device transmits information passively and wirelessly. The smart unlocking device can identify the position of the lock tongue wirelessly.

Only when the smart unlocking device is inserted in the lock and the lock is in the process of unlocking, can the position of the lock tongue be changed by turning the unlock device.

According to the working method of the smart interlock system, the implementation of unlocking or locking of the smart interlock system comprises the following steps:

Step 1: start the unlocking device; the unlocking device starts self-checking and indicates operators;

Step 2: select sequence of operations for equipment to be operated by pressing keys on the panel of the unlocking device, and press the enter key to confirm; the sequence of operations selected is a setting for the equipment to be operated;

Step 3: the unlocking device displays the information of the equipment to be operated;

Step 4: insert the unlocking module of the unlocking device in the lock, and the unlocking device starts the wireless identification circuit;

Step 5: the identity and state conversion module of the lock detects wireless identification signals of the unlocking device and sends the identity and the state information of the lock;

Step 6: according to the identity and the state information of the lock, the unlocking device lookups the mistake-proofing data storage of equipment, and finds the identity and the state corresponding to equipment;

Step 7: according to the identity and the state of the equipment, the unlocking device lookups the setting of the sequence of operations for the equipment to determine whether the conditions of operation are satisfied, if yes, a microprocessor sends a first signal to the sounder, and the sounder sends out a first sound signal of operation permission, which is also indicated on the display; simultaneously, the microprocessor sends a second signal to the unlocking module, and an unlocking pin of the unlocking module works so that the unlocking module can drive the unlocking mechanism of the lock; if not, the microprocessor sends a third signal to the sounder, and the sounder sends out a second sound signal of no operation, which is also indicated on the display;

Step 8: turn the unlocking device manually, and the unlocking device drives the unlocking parts of the lock, and drives the lock tongue to move axially;

Step 9: the axial motion of the lock tongue initiates the switching of the state of the identity and state conversion module; when the lock tongue moves to a preset position, the state of the lock is switched and the identity of the lock is changed;

Step 10: the unlocking device identifies the change of the identity of the lock through the wireless identity identifying module;

Step 11: the unlocking device finds that the state of the lock has been changed and determines the state of the equipment by looking-up the mistake-proofing data storage inside the equipment; the microprocessor sends a fourth signal to the sounder, and the sounder makes a sound signal of accomplishment of the operation, which is also indicated on the display; the microprocessor sends a fifth signal to the unlocking module, and the unlocking pin of the unlocking module works so that the unlocking module can't drive the unlocking mechanism of the lock, that is, the lock is locked;

Step 12: the unlocking device records the process data of the operations, which includes time, equipment, modes of operation and state of the equipment after being operated;

Step 13: repeat the steps above till the equipment operations in this sequence of operations are accomplished;

Step 14: the steps of the implementation of unlocking or locking of the smart interlock system end.

The implementation of unlocking of the lock comprises the following steps:

Step 1: insert the unlocking module of the unlocking device in the lock, and the unlocking device starts the wireless identify identification module;

Step 2: the identity and state conversion module of the lock detects a signal of wireless identification of the unlocking device and sends the identity and the state information of the lock;

Step 3: the unlocking device receives the identity and the state information, and starts the process of unlocking;

Step 4: the turning of the unlocking device drives the turntable locking mechanism, converts the rotary motion to linear motion, and drives the lock tongue to move through the jointly movement of the turntable locking mechanism;

Step 5: during the lock tongue is moving, if the identity and state conversion module detects the signals from the sensors and determines that the lock tongue moves to the set position, it will transmit the position information to the unlocking device;

Step 6: after the unlocking device receives the position information from the identity and state conversion module, return the unlocking device to its original position and pull it out;

Step 7: the process of unlocking of the lock ends.

Figure 10:
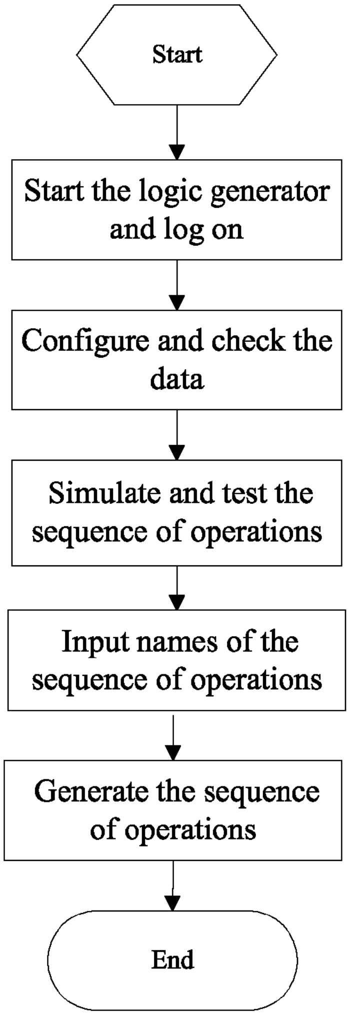
FIG. 10 is a flow chart illustrating the process of generating logic of the logic generator according to the method of the smart interlock system of the present invention.

As shown in FIG. 10, the process of generating logic of the logic generator comprises the following steps:

Step 1: start the logic generator and log on with user name and password;

Step 2: configure the identity information of the lock, input logical formulae and check the logic for correctness;

Step 3: simulate the sequence of operations according to requirements to test the logic of the sequence of operations for correctness;

Step 4: after simulating, input task names of the sequence of operations;

Step 5: generate the sequence of operations and logic data according to an established form;

Step 6: the generating of logic data and generating of data of sequence of operations end.

Figure 11:
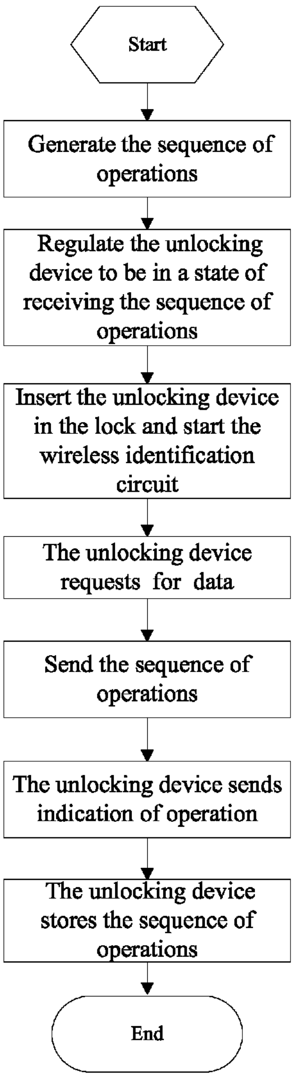
FIG. 11 is a flow chart illustrating the process of communicating between the unlocking device and the logic generator according to the method of the smart interlock system of the present invention.

As shown in FIG. 11, according to the smart interlock system, the process of communicating between the unlocking device and the logic generator comprises the following steps:

Step 1: start the logic generator and generate the sequence of operations of the equipment to be operated according to the steps of generating logic;

Step 2: start the unlocking device and regulate it to be in a state of receiving the sequence of operations;

Step 3: the unlocking device sends a request for obtaining data to the logic generator wirelessly;

Step 4: when it receives the request, the logic generator sends the sequence of operations to the unlocking via wireless signals;

Step 5: the unlocking device receives and stores the data;

Step 6: the process of communicating between the unlocking device and the logic generator ends.

The preferred embodiments described above are not restricted. It will be understood by those skilled in the art that various modifications and changes may be made therein without departing from the scope of the invention.

What is claimed is:

1. A smart interlock system, comprising a lock (1), an unlocking device (2) and a logic generator (3), characterized in that: the logic generator (3) comprises a logic generation module and a logic communication module;

the logic generation module generates identity identification logic and state identification logic of the lock, and the identity identification logic and state identification logic are sent to the unlocking device (2) through the logic communication module;

the unlocking device (2) comprises an unlocking module, an identity identifying module and a communication module for starting a lock head;

the lock (1) comprises a lock tongue (102), a lock head (106) and an identity and state conversion module (104);

the lock head (106) is associated with the lock tongue (102) and drives the lock tongue (102) to move; while in motion, the lock tongue (102) has more than two set positions and intermediate positions between set positions; the identity and state conversion module (104) converts information of change of position of the lock tongue (102) into identity label information of the lock, and then transmits the identity label information of the lock to the unlocking device (2) upon insertion of the unlocking module into lock (1);

the identity identifying module of the unlocking device (2) identifies the identity of the lock (1), receives the identity label information of the lock which is transmitted by the identity and state conversion module (104) of the lock, identifies the state of the lock tongue (102), and judges whether the process of unlocking shall be performed or not according to the identity identification logic and state identification logic of the lock, which are received from the logic generator (3).

2. The smart interlock system according to claim 1, characterized in that: the lock tongue (102) of the lock (1) is a bolt structure which is installed in the inner cavity of a lock body (101) and can move left and right; the lock head (106) comprises a top cover disposed at outermost end thereof, a lock core under the top cover, a stepped and cylindrical converting mechanism (103) and a turntable locking mechanism (105) under the converting mechanism (103); the turntable locking mechanism (105) is provided with a sliding pin (109) in the center of a top surface; the converting mechanism (103) is provided with a wedge-shaped groove (108) at the bottom; the sliding pin (109) is located in the wedge-shaped groove (108) so that a unidirectional ratchet mechanism is constituted; the lock tongue (102) is provided with a slide groove (111) whose opening faces upward; the turntable locking mechanism (105) is provided with a slide bar (110) at one end of the bottom; and the slide bar (110) is located in the slide groove (111), and so the turntable locking mechanism (105) drives the lock tongue (102) to move when it rotates.

3. The smart interlock system according to claim 2, characterized in that: the lock (1) comprises one or more sensors (107) which are installed on the turntable locking mechanism (105); the identity and state conversion module (104) comprises a switch (1043), electronic circuits (1042) and an antenna (1041); the sensors (107) are electrically connected with the identity and state conversion module (104) electrically; and the antenna (1041) is installed on top of the lock head (106).

4. The smart interlock system according to claim 1, characterized in that: the unlocking device (2) comprises a case (208); an unlocking module (205) and an identity identifying module (201) are installed at one end of the case (208); the case (208) is provided with a man-machine interface thereon, a control circuit therein and a socket (207) for recharging batteries on one side thereof; the identity identifying module (201) is a wireless identity identifying module; and the man-machine interface comprises keys (204), a display (206) and a sounder (202).

5. The smart interlock system according to claim 4, characterized in that: a control circuit of the unlocking device (2) comprises a battery (2081), a microprocessor CPU (2082), a sounder circuit (2083), a memory circuit (2084), a wireless communication circuit (2085), an unlocking driving circuit (2086), a wireless identification circuit (2089), a display circuit (2087) and a keys circuit (2088); the microprocessor CPU (2082) is connected electrically and respectively with the sounder circuit (2083), the memory circuit (2084), the wireless communication circuit (2085), the unlocking driving circuit (2086), the wireless identification circuit (2089), the display circuit (2087) and the keys circuit (2088), all of which are disposed inside the case (208); and the display circuit (2087), the keys circuit (2088) and the sounder circuit (2083) are respectively disposed to drive the display (206), the keys (204) and the sounder (202).

6. The smart interlock system according to claim 2, characterized in that: the unlocking module comprises an unlocking head (301), an unlocking rod (302), a stop groove (303), a solenoid (an electromagnet) (305) and a position detector (306); the identity identifying module (201) is disposed at the exterior of the unlocking rod (302) and near one end of the solenoid (305); the unlocking head (301) is telescopically located on top of the unlocking rod (302); the stop groove (303) is disposed on the unlocking rod (302) and the solenoid (305) is disposed at bottom of the unlocking rod (302); the lock core of the lock comprises a lock core body (1061), a lock core case (1062), a marble (1063) and a stop abutment (1064); the steel ball (1063) and the stop abutment (1064) are disposed inside the lock core case (1062), and the stop abutment (1064) is disposed on sidewall of an inner through hole of the top cover; and when the unlocking device is in the state of unlocking, the stop abutment (1064) is inserted in the stop groove (303).

7. A working method of the smart interlock system according to claim 1, characterized in that: the logic generation module of the logic generator generates identity identification logic and state identification logic of the lock, and the identity identification logic and state identification logic are sent to the unlocking device through the logic communication module; the identity and state conversion module converts information of the change of position of the lock tongue into the identity label information of the lock, and then transmits the identity label information of the lock to the unlocking device; the identity identifying module of the unlocking device identifies the identity of the lock, receives the identity label information of the lock which is transmitted by the identity and state conversion module of the lock, and identifies the state of the lock tongue; according to the identity identification logic and state identification logic of the lock, which are received from the logic generator, the identity identifying module of the unlocking device judges whether the equipment installed with the lock is allowed to be operated; if yes, an unlocking mechanism of the unlocking device allows unlocking, and drives unlocking parts of the lock so as to drive the lock tongue to move; then the equipment can be operated; if not, the lock can't be unlocked and the equipment can't be operated.

8. The working method of the smart interlock system according to claim 7, characterized in that the implementation of unlocking or locking of the smart interlock system comprises the following steps:

step 1: starting the unlocking device; the unlocking device starting self-checking and indicating operators;

step 2: selecting sequence for operations of equipment to be operated by pressing keys on the panel of the unlocking device and pressing the enter key to confirm; the sequence of operations selected being a setting for the equipment to be operated;

step 3: the unlocking device displaying the information of the equipment to be operated;

step 4: inserting the unlocking module of the unlocking device in the lock, and the unlocking device starting the wireless identification circuit;

step 5: the identity and state conversion module of the lock detecting wireless identification signals of the unlocking device and sending the identity and the state information of the lock;

step 6: according to the identity and the state information of the lock, the unlocking device lookuping the mistake-proofing data storage of equipment, and finding the identity and the state corresponding to equipment;

step 7: according to the identity and the state of the equipment, the unlocking device lookuping the setting of the sequence for operations for the equipment to determine whether the conditions of operation are satisfied, if yes, a microprocessor sending a first signal to the sounder, and the sounder sending out a first sound signal of operation permission, which is also indicated on the display; simultaneously, the microprocessor sending a second signal to the unlocking module, and an unlocking pin of the unlocking module working so that the unlocking module can drive the unlocking mechanism of the lock; if not, the microprocessor sending a third signal to the sounder, and the sounder sending out a sound signal of no operation, which is also indicated on the display;

step 8: turning the unlocking device manually; the unlocking device driving the unlocking parts of the lock and driving the lock tongue to move axially;

step 9: the axial motion of the lock tongue initiating the switching of the state of the identity and state conversion module; when the lock tongue moves to a preset position, the state of the lock being switched and the identity of the lock being changed;

step 10: the unlocking device identifying the change of the identity of the lock through the wireless identity identifying module;

step 11: the unlocking device finding that the state of the lock has been changed and determining the state of the equipment by looking-up the mistake-proofing data storage inside the equipment; the microprocessor sending a fourth signal to the sounder, and the sounder making a sound signal of accomplishment of the operation, which is also indicated on the display; the microprocessor sending a fifth signal to the unlocking module, and the unlocking pin of the unlocking module working so that the unlocking module can't drive the unlocking mechanism of the lock, namely, the lock is locked;

step 12: the unlocking device recording the process data of the operations, which includes time, equipment, modes of operation and state of the equipment after being operated;

step 13: repeating the steps above till the equipment operations in this sequence of operations are accomplished; and step 14: the steps of the implementation of unlocking or locking of the smart interlock system ending.

9. The working method of the smart interlock system according to claim 7, characterized in that the process of generating logic of the logic generator comprises the following steps:

step 1: starting the logic generator and log on with user name and password;

step 2: configuring the identity information of the lock, inputting logical formulae and checking the logic for correctness;

step 3: simulating the sequence of operations according to the requirement to test the logic of the sequence of operations for correctness;

step 4: after simulating, inputting task names of the sequence of operations;

step 5: generating the sequence of operations and logic data according to an established form; and step 6: the generating of logic data and generating of data of sequence of operations ending.

10. The working method of the smart interlock system according to claim 7, characterized in that: the process of communicating between the unlocking device and the logic generator comprises the following steps:

step 1: starting the logic generator and generating sequence of operations of the equipment to be operated according to the steps of generating logic;

step 2: starting the unlocking device and regulating it to be in a state of receiving the sequence of operations;

step 3: the unlocking device sending a request for obtaining data to the logic generator wirelessly;

step 4: when it receives the request, the logic generator sending the sequence of operations to the unlocking via wireless signals;

step 5: the unlocking device receives and stores the data; and step 6: the process of communicating between the unlocking device and the logic generator ending.

11. The smart interlock system according to claim 3, characterized in that: the unlocking module comprises an unlocking head (301), an unlocking rod (302), a stop groove (303), a solenoid (an electromagnet) (305) and a position detector (306); the identity identifying module (201) is disposed at the exterior of the unlocking rod (302) and near one end of the solenoid (305); the unlocking head (301) is telescopically located on top of the unlocking rod (302); the stop groove (303) is disposed on the unlocking rod (302) and the solenoid (305) is disposed at bottom of the unlocking rod (302); the lock core of the lock comprises a lock core body (1061), a lock core case (1062), a marble (1063) and a stop abutment (1064); the steel ball (1063) and the stop abutment (1064) are disposed inside the lock core case (1062), and the stop abutment (1064) is disposed on sidewall of an inner through hole of the top cover; and when the unlocking device is in the state of unlocking, the stop abutment (1064) is inserted in the stop groove (303).

12. The smart interlock system according to claim 4, characterized in that: the unlocking module comprises an unlocking head (301), an unlocking rod (302), a stop groove (303), a solenoid (an electromagnet) (305) and a position detector (306); the identity identifying module (201) is disposed at the exterior of the unlocking rod (302) and near one end of the solenoid (305); the unlocking head (301) is telescopically located on top of the unlocking rod (302); the stop groove (303) is disposed on the unlocking rod (302) and the solenoid (305) is disposed at bottom of the unlocking rod (302); the lock core of the lock comprises a lock core body (1061), a lock core case (1062), a marble (1063) and a stop abutment (1064); the steel ball (1063) and the stop abutment (1064) are disposed inside the lock core case (1062), and the stop abutment (1064) is disposed on sidewall of an inner through hole of the top cover; and when the unlocking device is in the state of unlocking, the stop abutment (1064) is inserted in the stop groove (303).

13. The smart interlock system according to claim 5, characterized in that: the unlocking module comprises an unlocking head (301), an unlocking rod (302), a stop groove (303), a solenoid (an electromagnet) (305) and a position detector (306); the identity identifying module (201) is disposed at the exterior of the unlocking rod (302) and near one end of the solenoid (305); the unlocking head (301) is telescopically located on top of the unlocking rod (302); the stop groove (303) is disposed on the unlocking rod (302) and the solenoid (305) is disposed at bottom of the unlocking rod (302); the lock core of the lock comprises a lock core body (1061), a lock core case (1062), a marble (1063) and a stop abutment (1064); the steel ball (1063) and the stop abutment (1064) are disposed inside the lock core case (1062), and the stop abutment (1064) is disposed on sidewall of an inner through hole of the top cover; and when the unlocking device is in the state of unlocking, the stop abutment (1064) is inserted in the stop groove (303).

* * * * *